US007957065B2

(12) United States Patent
Jaster

(10) Patent No.: US 7,957,065 B2
(45) Date of Patent: Jun. 7, 2011

(54) SKYLIGHT COLLIMATOR WITH MULTIPLE STAGES

(75) Inventor: Paul Jaster, Carlsbad, CA (US)

(73) Assignee: Solatube International, Inc., Vista, CA (US)

( * ) Notice: Subject to any disclaimer, the term of this patent is extended or adjusted under 35 U.S.C. 154(b) by 145 days.

(21) Appl. No.: 12/478,025

(22) Filed: Jun. 4, 2009

(65) Prior Publication Data

US 2010/0309556 A1 Dec. 9, 2010

(51) Int. Cl.
*G02B 17/00* (2006.01)

(52) U.S. Cl. ........................................................ 359/592

(58) Field of Classification Search .......... 359/592–593, 359/595, 598; 52/200; 362/1
See application file for complete search history.

(56) References Cited

U.S. PATENT DOCUMENTS 2,858,734 A 11/1958 Boyd
4,126,379 A * 11/1978 Wu ................................ 359/593
4,615,579 A * 10/1986 Whitehead .................... 359/592
4,733,505 A * 3/1988 Van Dame ....................... 52/200
5,099,622 A 3/1992 Sutton
5,467,564 A * 11/1995 DeKeyser et al. ............ 359/592
5,648,873 A 7/1997 Jaster et al.
5,655,339 A 8/1997 DeBlock et al.
5,878,539 A * 3/1999 Grubb ............................. 52/200
5,896,712 A 4/1999 Chao
5,897,201 A 4/1999 Simon
6,219,977 B1 4/2001 Chao et al.
6,256,947 B1 7/2001 Grubb
6,363,667 B2 4/2002 O'Neill
7,757,444 B1 * 7/2010 Halliday ......................... 52/200
2001/0013207 A1 8/2001 O'Neill
2002/0051297 A1 * 5/2002 Hoy et al. ...................... 359/597
2002/0085393 A1 7/2002 Eisenman et al.
2005/0128728 A1 6/2005 Eisenman et al.

* cited by examiner

*Primary Examiner* — Christopher Mahoney
(74) *Attorney, Agent, or Firm* — John L. Rogitz

(57) ABSTRACT

A non-specular skylight collimator has at least two axially successive collimator segments from top to bottom, with the segments becoming successively less flared from top to bottom. A skylight diffuser assembly typically covers the open end of the bottom segment.

18 Claims, 4 Drawing Sheets

SKYLIGHT COLLIMATOR WITH MULTIPLE STAGES

FIELD OF THE INVENTION

The present invention relates generally to skylight collimators.

BACKGROUND OF THE INVENTION

Briefly, a tubular skylight such as those mentioned in U.S. Pat. Nos. 5,896,713 and 6,035,593, both of which are owned by the same assignee as is the present invention and both of which are incorporated herein by reference, includes a tube assembly mounted between the roof and ceiling of a building. The top end of the tube assembly is covered by a roof-mounted cover, while the bottom end of the tube assembly is covered by a ceiling-mounted diffuser plate. With this combination, natural light external to the building is directed through the tube assembly into the interior of the building to illuminate the interior.

As understood herein, the tube with vertical sides reflects light in the same angle each reflection, which angle depends on the sun's elevation in the sky and thus varying throughout the day, limiting the efficiency and effectiveness of the diffuser in controlling the distribution of light in the building.

SUMMARY OF THE INVENTION

The present invention has recognized that to optimize the light transmission through the cover, a collimator may be provided above the diffuser, and furthermore the collimator need not be specular.

Accordingly, a skylight assembly includes a skylight shaft and a collimator assembly operably engaged with the shaft. The collimator assembly includes an axial series of multiple collimator segments. In the limit in which the number of segments in the series approaches infinity, the collimator assumes a curved shape in longitudinal cross-section. A first collimator segment defines a first collimating angle with respect to an axis of the collimator assembly and subsequent collimating segments define respectively different (and steeper) collimating angles with respect to the axis. The collimating angles can be oblique. The collimating angles (and in the limiting case, the curve of the assembly) can be established by the desired degree of collimation, the expected range of angles at which sunlight enters the assembly, and the diameter of the entrance to the collimator.

In some examples, the collimating assembly includes a third collimating segment defining a third collimating angle different from the first and second collimating angles. The collimating segments can be successively less flared than each other. An upper collimating segment can be more flared than a lower collimator segment. The inside surface of the collimating assembly may be non-specular.

In another embodiment, a skylight collimator assembly has a first frustum-shaped collimator segment defining a first cone angle and a second frustum-shaped collimator segment connected to the first segment and coaxial therewith. The second segment defines a second cone angle more acute than the first cone angle.

In another aspect, a skylight has a skylight tube defining an upper end and a lower end, a skylight cover disposed above the upper end and permitting light to enter the tube, and a collimator assembly disposed below the lower end to receive light therefrom. The collimator assembly has a non-specular inside surface. A diffuser is disposed below the lower end of the collimator assembly. In some embodiments the assembly has multiple collimator segments.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
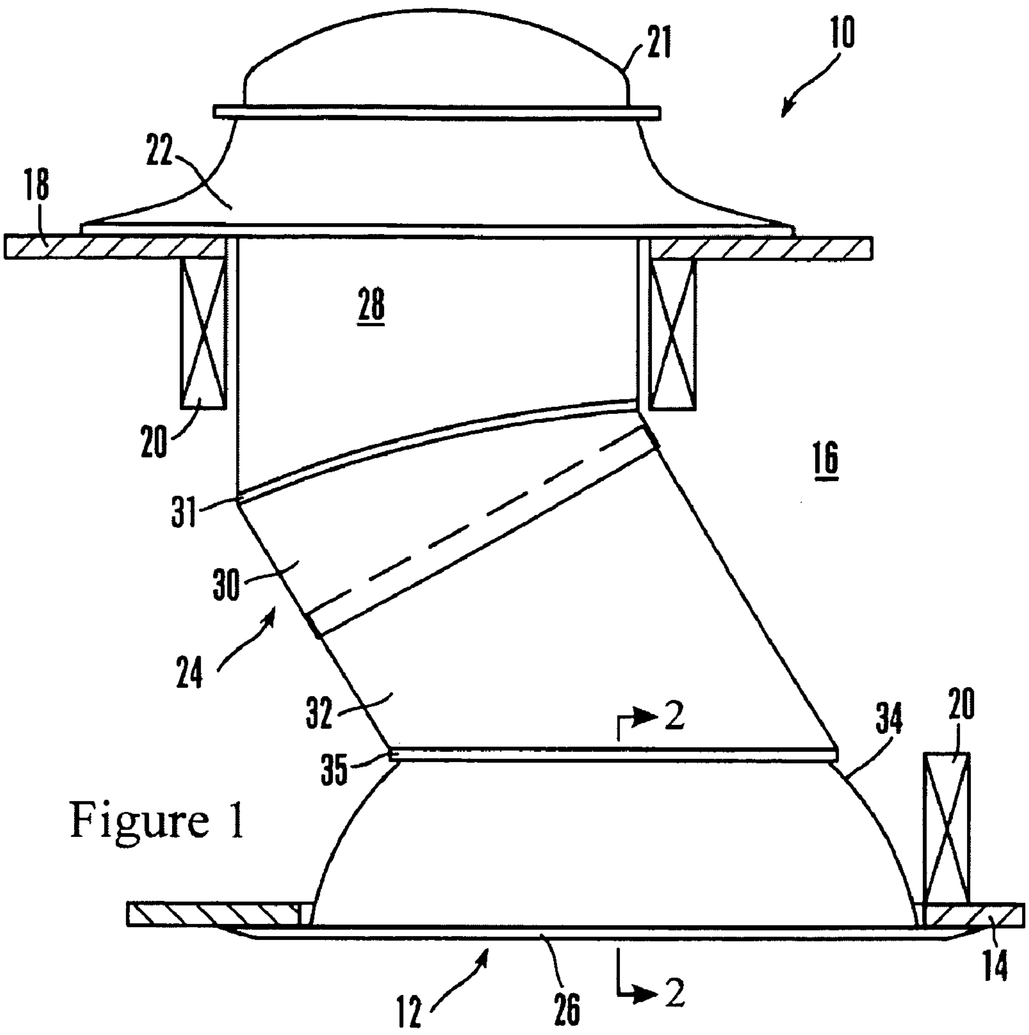
FIG. 1 is a side view in partial cross-section of an example non-limiting tubular skylight showing an example environment of the collimator.

Referring initially to FIG. 1, a tubular skylight made in accordance with the present invention is shown, generally designated 10, for lighting, with natural sunlight, an interior room 12 having a ceiling dry wall 14 in a building, generally designated 16. FIG. 1 shows that the building 16 has a roof 18 and one or more joists 20 that support the roof 18 and ceiling dry wall 14.

As shown in FIG. 1, the skylight 10 includes a rigid hard plastic or glass roof-mounted cover 21. The cover 21 is optically transmissive and preferably is transparent.

The cover 21 may be mounted to the roof 18 by means of a ring-like metal flashing 22 that is attached to the roof 18 by means well-known in the art. The metal flashing 22 can be angled as appropriate for the cant of the roof 18 to engage and hold the cover 21 in the generally vertically upright orientation shown.

As further shown in FIG. 1, an internally reflective hollow metal shaft assembly, generally designated 24, is connected to the flashing 22. The cross-section of the assembly 24 can be cylindrical, rectangular, triangular, etc. Accordingly, while the word "tube" is used from time to time herein, it is to be understood that the principles of the present invention are not to be limited to a tube per se.

The shaft assembly 24 extends to the ceiling 14 of the interior room 12. Per the present invention, the shaft assembly 24 directs light that enters the shaft assembly 24 downwardly to a light diffuser assembly, generally designated 26, that is disposed in the room 12 and that is mounted to the ceiling 14 or to a joist 20 as described in the above-mentioned '593 patent.

The shaft assembly 24 can be made of a metal such as an alloy of aluminum or steel, or the shaft assembly 24 can be made of plastic or other appropriate material. The interior of the shaft assembly 24 is rendered reflective by means of, e.g., electroplating, anodizing, metallized plastic film coating, or other suitable means.

In one example embodiment, the shaft assembly 24 is established by a single shaft. However, as shown in FIG. 1, if desired, the shaft assembly 24 can include multiple segments, each one of which is internally reflective in accordance with present principles. Specifically, the shaft assembly 24 can include an upper shaft 28 that is engaged with the flashing 22 and that is covered by the cover 21. Also, the shaft assembly 24 can include an upper intermediate shaft 30 that is contiguous to the upper shaft 28 and that can be angled relative thereto at an elbow 31 if desired. Moreover, the shaft assembly 24 can include a lower intermediate shaft 32 that is slidably engaged with the upper intermediate shaft 30 for absorbing thermal stresses in the shaft assembly 24. And, a collimator-like lower shaft 34 can be contiguous to the lower intermediate shaft 32 and join the lower intermediate shaft 32 at an elbow 35, with the bottom of the lower shaft 34 being covered by the diffuser assembly 26. The elbow 35 is angled as appropriate for the building 16 such that the shaft assembly 24 connects the roof-mounted cover 21 to the ceiling-mounted diffuser assembly 26. It is to be understood that where appropriate, certain joints between shafts can be mechanically fastened and covered with tape in accordance with principles known in the art.

Figure 2:
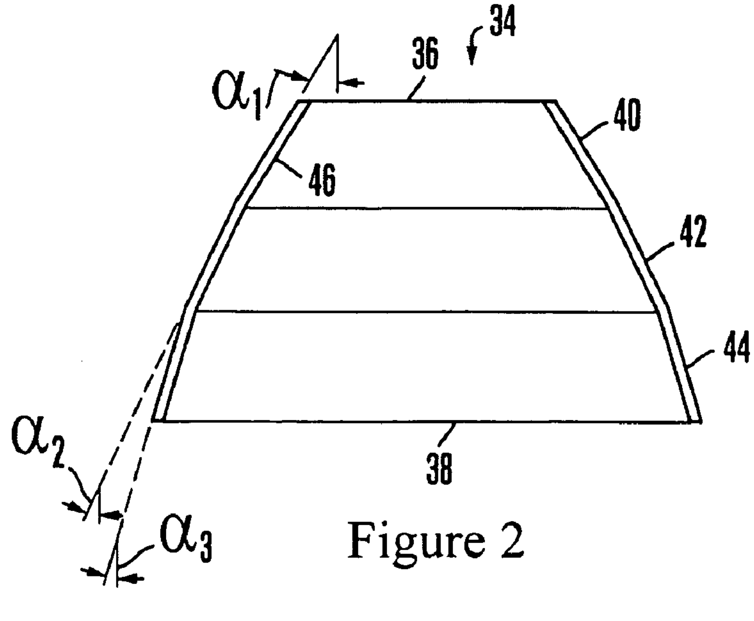
FIG. 2 is a cross-sectional view of the collimator as seen along the line 2-2 in FIG. 1.

As shown in FIG. 2, the collimator-like lower shaft 34 referenced in FIG. 1 is presented in greater detail. As may now be appreciated, in non-limiting embodiments the collimator-like lower shaft 34 has an axial series of multiple collimator segments. It may further be appreciated that each collimating segment of the shaft 34 is successively less outwardly-flared from top to bottom than the one immediately above it.

The collimator-like lower shaft 34 shown in FIG. 2 has a top 36 and a bottom 38. The top 36 of the shaft 34 may be contiguously engaged to the lower intermediate shaft 32 as described in reference to FIG. 1 above. The bottom 38 of the shaft 34 may be covered by the diffuser assembly 26 as also described above. The bottom of the collimator may also be left open without a diffuser assembly engaged therewith.

Also as stated above, the shaft 34 has multiple collimating segments. In some embodiments the collimating segments are frusto-conical. In other embodiments they may assume other collimating shapes, e.g., frusto-pyramidal.

Thus, there may be a first frustum-shaped collimating segment 40 defining a first collimating angle $\alpha_1$ with respect to an axis of the collimator assembly 34 and a second frustum-shaped collimating segment 42 connected to the segment 40 and defining a second collimating angle $\alpha_2$ that is less than the first collimating angle with respect to an axis of the collimator assembly 34. Furthermore, in non-limiting embodiments there may also be a third frustum-shaped collimating segment 44 connected to the segment 42 and defining a third collimating angle $\alpha_3$ that is less than the first and second collimating angles. It is to be further understood that each collimating angle referenced in the present application may be oblique. Additional segments may be provided in accordance with disclosure below.

Still referencing FIG. 2, the collimating segment 40 is more flared than the collimating segment 42. Similarly, in non-limiting embodiments that include a third collimating segment 44, the collimating segment 42 is more flared than the third collimating segment 44. Should there be more than three collimating segments, each upper collimating segment may be more flared than the one below it.

Last, it may also be appreciated from FIG. 2 that there is an inside surface 46 of the collimating assembly 34. The inside surface 46 of the assembly 34 is understood to be non-specular in non-limiting embodiments. Examples of such non-specular surfaces are disclosed in the present assignee's U.S. Pat. No. 7,146,768 and USPPs 2006/0191214 and 2007/0266652, incorporated herein by reference. In brief, the non-specular inside surface can be established by a structured surface in the metal substrate, reflective film or adhesive on the film. It can be in the form of dimples, corrugated patterns or other shapes known to provide a controlled spread of light of, e.g., less than about ten degrees. Using a non-specular surface provides a controlled light spread as desired, e.g., a spread of light that is less than plus or minus five degrees from the central reflected ray of light.

The multi-stage collimator described above advantageously consumes less axial space than a single stage collimator yielding equivalent performance.

Figure 3:
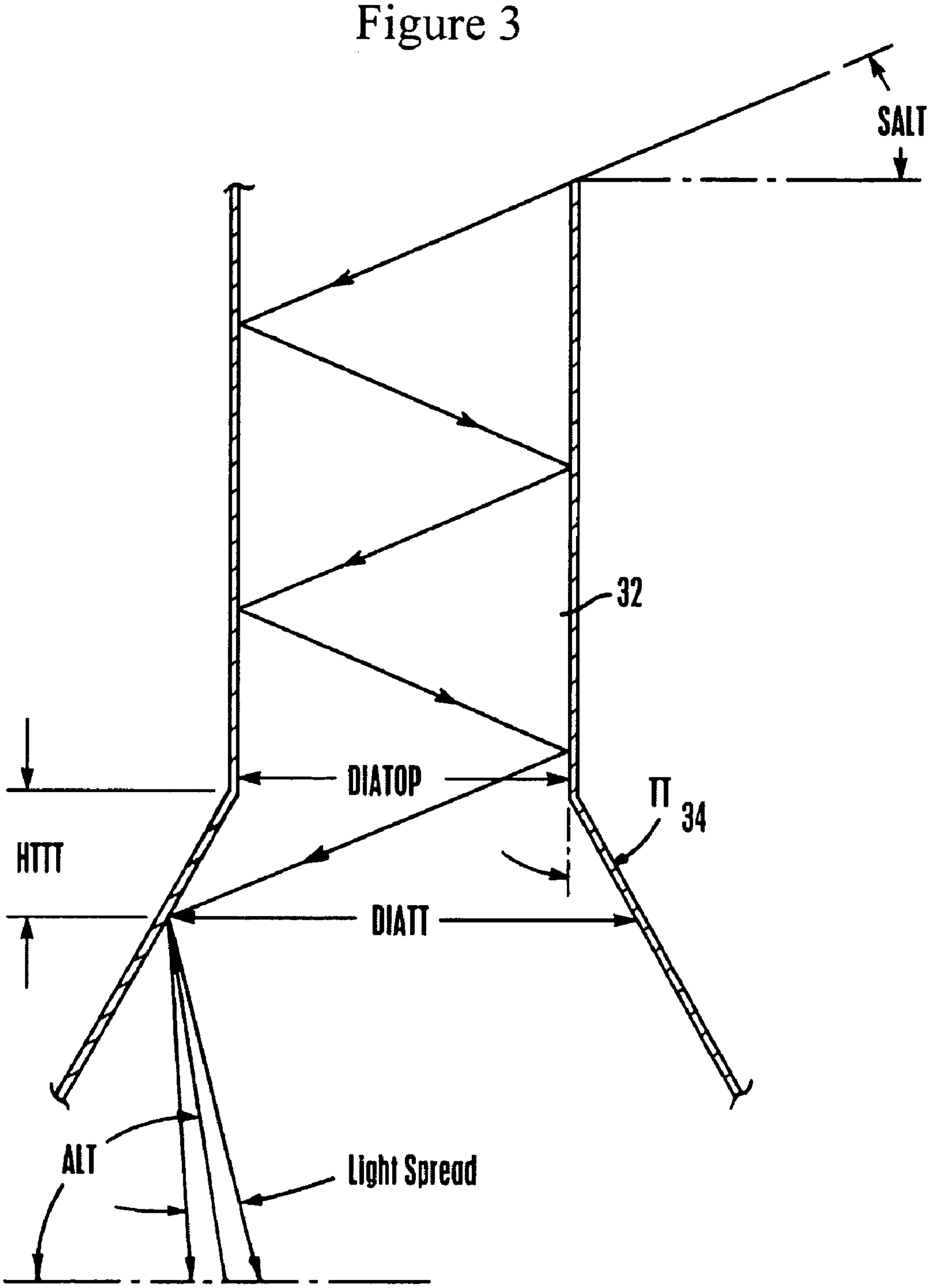
FIG. 3 is a side schematic view showing collimator parameters.

With greater specificity and with the understanding that the discussion below is not intended to limit the invention but rather provide background explanation, the following terms are used. Refer to FIG. 3. "SALT" (in degrees) refers to the solar altitude, angle of the sun from the horizontal plane, and the angle of the sunlight reflecting down a parallel walled tube. "TT" (degrees) refers to the tube taper, angle from vertical and/or parallel, while "ALT" (in degrees) refers to the alignment angle of light after reflecting off of the tapered wall. This angle is in relation to a horizontal plane. Then:

TT=((ALT)−(SALT))/2 and ALT=(2)(TT)+(SALT)

Present principles can be used to provide a single reflection, variable tapered tube that is optimally designed to realign sunlight while minimizing reflective material and space of the collimator.

In example embodiments and now referring to FIG. 3, dimensions of the first (top) segment may be determined using the following equations:

- DIATOP(inches)=Diameter of tapered tube at the top or light entrance;
- DIATT(inches)=Diameter of tapered tube where light is reflected based on light entering the tapered tube from the top diameter at a specific SALT and light reflected at a specific ALT requirement;
- HTTT(inches)=Height of tapered tube at the related DIATT; then DIATT=(2)((DIATOP)(tan SALT))/((1/tan TT)−(tan SALT))+(DIATOP)

HTTT=(DIATT-DIATOP)/(2 tan TT) where "TT" is the angle of tube taper relative to the vertical axis.

Each consecutive segment diameter and height can be determined from the previous segments values as follows: N is new value, P is previous value and AP is ½ the increase in diameter from DIATOP to DIATTP. Thus using the example in the table below to determine HTTTN for the collimator @ a SALT of 35 degrees, AP would be (13.64−10.0)/2=1.82".

HTTTN=((DIATOP+*AP*)(tan SALTN)−(HTTTP)(tan SALTN)(tan TTN))/1−(tan SALTN)(tan TTN)

DIATTN=DIATTP+(2)(HTTTN−HTTTP)(tan TTN)

Preferably, light undergoes only one reflection in the variable tapered tube to provide the required alignment angle.

Figure 4:
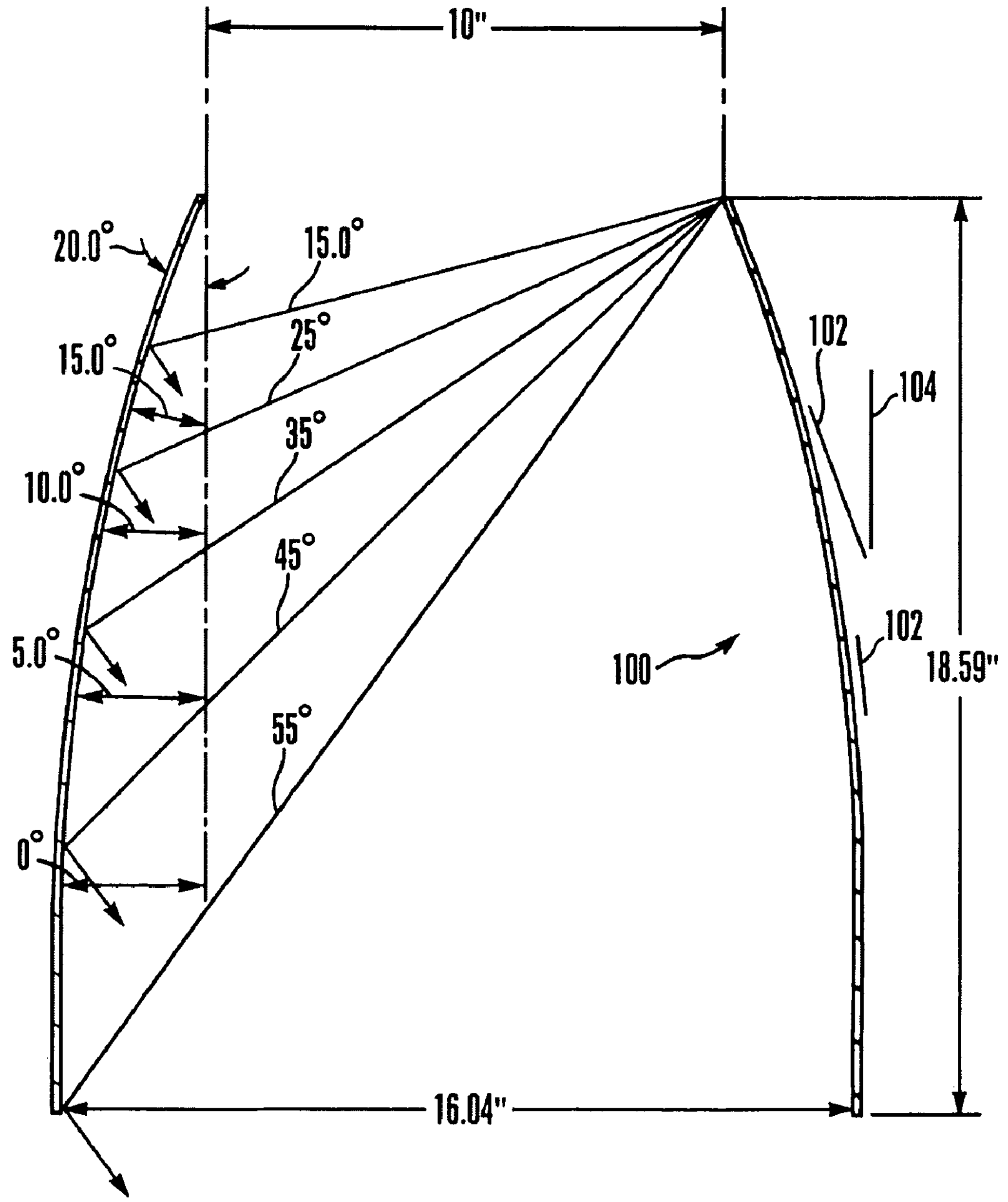
FIG. 4 is a side schematic view of an alternate collimator assembly in which the number of segments approaches infinity, effectively establishing a collimator that is continuously curved at ever-steeper tangents in the longitudinal dimension.

With the above in mind, for a variable tapered tube that provides an alignment angle (ALT, the axis of the light spread as shown) greater than or equal to 55 degrees with an input range of light (SALT) from 15 degrees up to 55 degrees, the following dimensions may be used. The below table is in increments of ten degrees/five segments of (SALT). For this example, the top of the tapered tube opening is assumed to be ten inches in diameter. An example multiple stage collimator is shown in FIG. 4.

| SALT | TT | Tube Dia. | Tube height |
|---|---|---|---|
| 15° | 20° | 12.16" | 2.96" |
| 25 | 15 | 13.64 | 5.51 |
| 35 | 10 | 14.91 | 8.72 |
| 45 | 5 | 15.81 | 12.90 |
| 55 | 0 | 16.04 | 18.59 |

The multiple stage collimator results in smaller dimensions than were a single stage collimator to be used with a taper angle of eight degrees to accomplish the same requirement. Such a single stage collimator would be expected to be fully one third-longer in axial dimension and six percent greater in diameter than the multi-stage collimator of equivalent performance.

In addition to saving space, use of a non-specular inside surface with controlled light spread in the present collimator can reduce glare and non-uniform illumination associated with using a specularly reflective surface. A non-specular surface provides a controlled spread of light, less than approximately ten degrees, which eliminates the problems mentioned above, without unduly affecting the alignment angle since there is only one reflection.

It may now be appreciated that use of a multi-stage collimator changes the angle of low angle sunlight to a consistent high angle and, when a non-specular inside surface is used, with a minimum of glare. By maintaining relatively high angles to the diffuser/glazing independent of the solar altitude, consistent glazing efficiencies are maintained throughout the day. Furthermore, by establishing the downward angle of the sunlight and slightly spreading the light at the same time as described above, in some examples no diffuser need cover the open bottom end 38 of the collimator, simulating a recessed lighting fixture. Present principles also provide a consistent angular controlled light source for any light directing pendent or other optical element placed under the variable tapered tube.

A collimator assembly 100 may be provided as shown in FIG. 4 that has more than three stages and indeed may have a number of stages that approach the limit of infinity, i.e., each stage effectively has little or no thickness in the longitudinal dimension. Accordingly, the collimator 100 assumes a continuously curved shape in the longitudinal dimension as shown in FIG. 4 in which tangents 102 to the surface with respect to the longitudinal axis 104 of the collimator progressively define steeper angles from the collimator's light entry to the light exit. The equations above may be used at each axial location to establish the tangent at that location. The reflection angles and collimator dimensions shown in FIG. 4 are exemplary only and not limiting.

Figure 5:
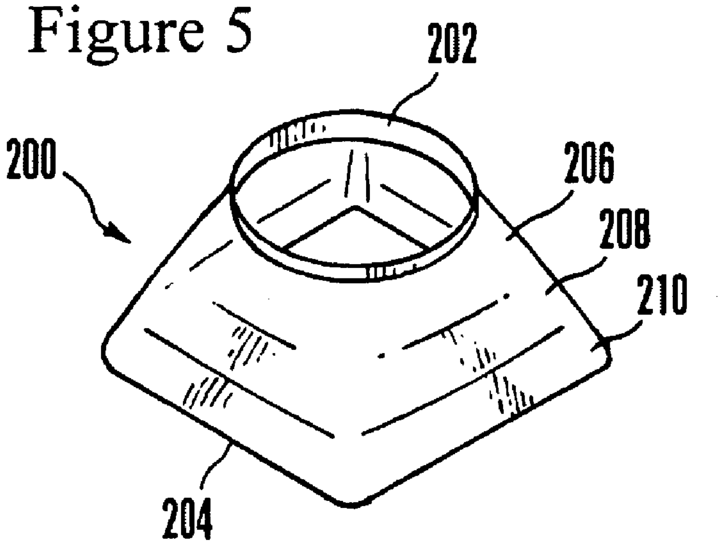
FIG. 5 is a perspective view of an alternate collimator having a round-to-square configuration.
Figure 6:
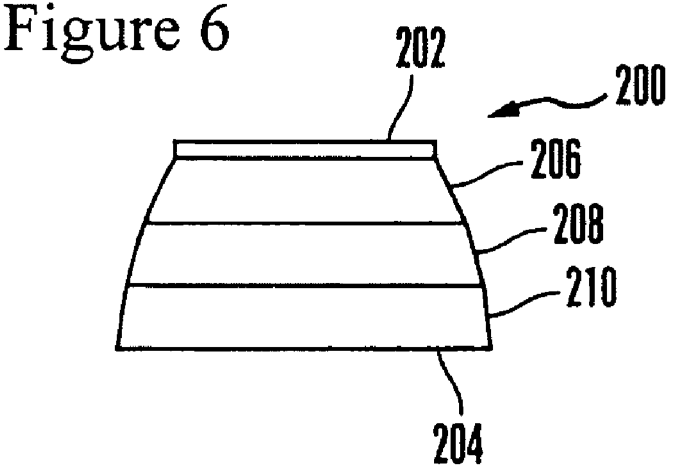
FIG. 6 is an elevational view of the collimator shown in FIG. 5.
Figure 7:
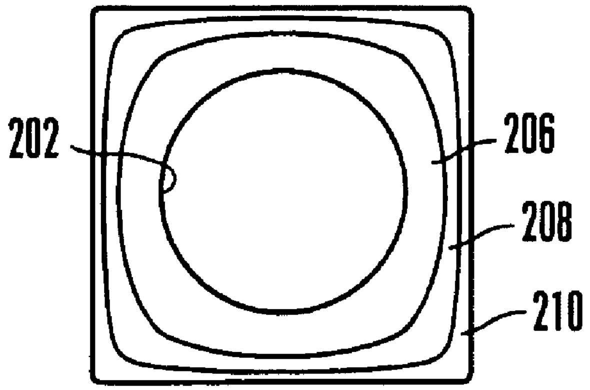
FIG. 7 is a top plan view of the collimator shown in FIG. 5.

A collimator assembly 200 is shown in FIGS. 5-7 that has, from a round top opening 202 to a rectilinear bottom opening 204, multiple collimator stages 206, 208, 210, with the stages 206-210 being successively less flared than the next upper stage. Thus, the assembly 200 in FIGS. 5-7 is substantially identical to the collimators discussed above with the exception of the round to square configuration from top to bottom as shown. To achieve the round-to-square configuration, in which the top opening 202 may mate with the bottom of a cylindrical skylight tube while the bottom opening 204 may mate with a rectilinear diffuser or ceiling opening, the stages 206-210 transition progressively in the axial dimension from mostly round (the top stage 206) to predominantly rectilinear (bottom stage 210) as shown.

While the particular SKYLIGHT COLLIMATOR WITH MULTIPLE STAGES is herein shown and described in detail, it is to be understood that the subject matter which is encompassed by the present invention is limited only by the claims.

What is claimed is:

1. A skylight assembly, comprising:

at least one skylight shaft;

a collimator assembly operably engaged with the shaft, the collimator assembly including an axial series of multiple collimator segments, at least a first collimator segment defining a first collimating angle with respect to an axis of the collimator assembly and a second collimating segment defining a second collimating angle with respect to the axis that is different from the first collimating angle, both collimating angles being oblique.

2. The assembly of claim 1, wherein the collimating assembly comprises more than two collimating segments successively defming respective collimating angles different from the first and second collimating angles.

3. The assembly of claim 1, wherein the collimating segments are successively less flared than each other.

4. The assembly of claim 1, wherein an upper collimating segment is more flared than a lower collimator segment.

5. The assembly of claim 1, wherein the inside surface of the collimating assembly is non-specular.

6. The assembly of claim 1, wherein the collimator segments together define a collimator assembly that is continuously curved in a longitudinal dimension.

7. The assembly of claim 1, wherein the collimator assembly has a round top opening and a rectilinear bottom opening.

8. Skylight collimator assembly, comprising:

first frustum-shaped collimator segment defining a first cone angle; and second frustum-shaped collimator segment connected to the first segment and coaxial therewith, the second segment defining a second cone angle more acute than the first cone angle.

9. The assembly of claim 8, comprising a third frustum-shaped collimator segment connected to the second segment and coaxial therewith, the third segment defining a third cone angle more acute than the second cone angle.

10. The assembly of claim 9, wherein the collimator segments together define a collimator assembly that is continuously curved in a longitudinal dimension.

11. The assembly of claim 8, wherein the inside surface of the collimating assembly is non-specular.

12. The assembly of claim 8, wherein the collimator assembly has a round top opening and a rectilinear bottom opening.

13. Skylight, comprising:

skylight tube defining upper end and lower end;

skylight cover disposed above the upper end and permitting light to enter the tube;

collimator assembly disposed below the lower end to receive light therefrom, the collimator assembly having a non-specular inside surface and at least a first collimator stage; and diffuser disposed below a lower end of the collimator assembly, wherein the first collimator stage of the collimator assembly defines a first collimating angle with respect to the axis of the collimator assembly and a second collimating stage of the collimator assembly defines a second collimating angle with respect to the axis that is different from the first collimating angle, both collimating angles being oblique.

14. The skylight of claim 13, wherein the collimating assembly comprises a third collimating stage defining a third collimating angle different from the first and second collimating angles.

15. The skylight of claim 13, wherein the collimating stages are successively less flared than each other.

16. The skylight of claim 13, wherein the first stage is an upper collimating stage that is more flared than the second stage which is a lower collimator stage.

17. Skylight, comprising:

skylight tube defining upper end and lower end;

skylight cover disposed above the upper end and permitting light to enter the tube;

collimator assembly disposed below the lower end to receive light therefrom, the collimator assembly having a non-specular inside surface and at least a first collimator stage; and diffuser disposed below a lower end of the collimator assembly, wherein the collimator assembly is continuously curved in a longitudinal dimension to define a curvature in the longitudinal dimension of the collimator assembly, the curvature changing at a continuously changing rate along the length of the collimator assembly.

18. The skylight of claim 13, wherein the collimator assembly has a round top opening and a rectilinear bottom opening.

* * * * *